United States Patent [19]

McCombs

[11] Patent Number: 5,531,807
[45] Date of Patent: Jul. 2, 1996

[54] APPARATUS AND METHOD FOR SUPPLYING OXYGEN TO PASSENGERS ON BOARD AIRCRAFT

[75] Inventor: Norman R. McCombs, Tonawanda, N.Y.

[73] Assignee: AirSep Corporation, Buffalo, N.Y.

[21] Appl. No.: 347,808

[22] Filed: Nov. 30, 1994

[51] Int. Cl.[6] .................................................. B01D 53/47
[52] U.S. Cl. .................... 95/26; 95/96; 95/130; 95/115; 95/130; 95/133; 95/144; 55/267; 55/357; 55/359
[58] Field of Search ............................ 55/356, 357, 359, 55/360, 267–269; 95/96, 98, 102, 130, 26; 96/108, 115–117, 121, 130, 133, 144, 149

[56] References Cited

U.S. PATENT DOCUMENTS

| | | | |
|---|---|---|---|
| 3,323,291 | 6/1967 | Kern | 96/130 X |
| 4,222,750 | 9/1980 | Gauthier et al. | 95/102 |
| 4,263,018 | 4/1981 | McCombs et al. | 96/130 X |
| 4,349,357 | 9/1982 | Russell | 96/117 X |
| 4,378,982 | 4/1983 | McCombs | 96/117 |
| 4,449,990 | 5/1984 | Tedford, Jr. | 96/115 X |
| 4,491,459 | 1/1985 | Pinkerton | 96/130 X |
| 4,511,377 | 4/1985 | McCombs | 96/116 X |
| 4,545,790 | 10/1985 | Miller et al. | 96/130 X |
| 4,576,616 | 3/1986 | Mottram et al. | 95/96 |
| 4,584,001 | 4/1996 | Dechene | 96/133 X |
| 4,670,223 | 6/1987 | Delachapelle | 96/133 X |
| 4,681,099 | 7/1987 | Sato et al. | 96/130 X |
| 4,681,602 | 7/1987 | Glenn et al. | 96/121 X |
| 4,826,510 | 5/1989 | McCombs | 96/127 |
| 4,880,443 | 11/1989 | Miller et al. | 96/115 X |

FOREIGN PATENT DOCUMENTS

| | | | |
|---|---|---|---|
| 1-067221 | 3/1989 | Japan | 96/133 |
| 1-245827 | 10/1989 | Japan | 96/133 |

*Primary Examiner*—Robert Spitzer
*Attorney, Agent, or Firm*—Hodgson, Russ, Andrews, Woods & Goodyear

[57] ABSTRACT

An apparatus and method for supplying oxygen to passengers on board an aircraft in the form of a portable machine including a housing having a shape and size allowing it to be positioned under a seat on the aircraft, an air separation device in the housing for separating oxygen from the air inside the aircraft, a self-contained compressed air supply in the housing including a compressor operatively connected to the air separation device and a brushless d-c motor for driving the compressor, and a circuit for connecting the d-c motor to the aircraft electrical power source including converting the a-c voltage and current on board the aircraft to d-c voltage and current for operating the motor. The brushless motor insures compliance with airline requirements that the machine generates a low level of electrical interference. The machine includes an intake resonator and a muffler associated therewith for reducing the level of noise generated to a value acceptable for airline use. The method and apparatus has the capability of delivering oxygen at various predetermined flow rates easily manually selected by the user. The machine preferably includes a PSA unit containing two beds and a four-way valve for connecting the compressed air supply to the beds in a controlled manner, the timing and control operating the system in a manner such that the four-way valve can be of the slide type with its advantages of long life and reliability.

20 Claims, 16 Drawing Sheets

5,531,807

APPARATUS AND METHOD FOR SUPPLYING OXYGEN TO PASSENGERS ON BOARD AIRCRAFT

BACKGROUND OF THE INVENTION

This invention relates to the art of supplying oxygen for therapeutic use, and more particularly to a new and improved apparatus for supplying such oxygen to passengers on board aircraft.

Individuals suffering from diseases such as chronic obstructive pulmonary disease (COPD) or emphysema benefit from the administration of an oxygen rich gas stream. The source of this oxygen rich gas stream is normally high pressure cylinders, containerized liquid or chemical means, i.e. chlorate candle. Each of these methods involves the storage of relatively high volumes of oxygen. This represents a potential safety hazard in that oxygen has the effect of lowering the ignition temperature of material with which it comes in contact. High pressure cylinders present an additional safety concern being stored in excess of 2000 psig as well as being very bulky and heavy. Cryogenic oxygen is also potentially dangerous since it is stored at −297° F. and requires frequent refilling due to continuous boil off. Chemical oxygen is liberated as result of the virtual ignition of various chemical compounds and is useful as an oxygen supply only for short intervals, i.e. about 20 minutes.

Individuals requiring oxygen treatment who wish to travel by aircraft must request the airline to supply it in sufficient quantity to satisfy their prescription. Airlines have an obligation to supply the same at an agreed upon fixed cost regardless of the duration of flight. The aforementioned means of supply are very costly and space consuming. With world attention becoming increasingly focused on the needs of the disabled, there is a need for airlines to make oxygen therapy readily available to those requiring it.

It would, therefore, be highly desirable to provide an apparatus and method for supplying oxygen to passengers on aircraft on an as needed basis without storing it at high pressure, extremely low temperature or in very limited quantity. In providing such apparatus and method, important considerations involve using raw material, i.e. cabin air, and operating energy, i.e. electricity, already present in the aircraft, and in a manner not presenting any safety hazard while the aircraft is in operation. In addition, such apparatus desirably will be small in size so as to be portable and locatable under passenger seats during use and which can remain on the aircraft after the passengers depart.

SUMMARY OF THE INVENTION

It is, therefore, a primary object of this invention to provide a new and improved apparatus and method for supplying therapeutic oxygen to passengers on an aircraft.

It is a further object of this invention to provide such a method and apparatus which supplies oxygen on an as needed basis without storing it at high pressure, extremely low temperatures or in very limited quantity.

It is a further object of this invention to provide such method and apparatus which utilizes air in the aircraft cabin to supply such oxygen.

It is a more particular object of this invention to provide such a method and apparatus which separates and concentrates oxygen from air in the aircraft cabin by a pressure swing adsorption process.

It is a further object of this invention to provide such method and apparatus which utilizes the electrical power available on the aircraft in a manner which does not create any electrical interference problems.

It is a further object of this invention to provide such an apparatus which is small in size and light in weight so as to be portable and which has a low profile so as to be locatable under a passenger seat on an aircraft.

The present invention provides an apparatus and method for supplying oxygen to passengers on board an aircraft in the form of a portable machine including a housing having a shape and size allowing it to be positioned under a seat on the aircraft, an air separation device in the housing for separating oxygen from the air inside the aircraft, self-contained compressed air supply means in the housing comprising a compressor operatively connected to the air separation device and a brushless d-c motor for driving the compressor, and circuit means for connecting the d-c motor to the aircraft electrical power source and including means for converting the a-c voltage and current on board the aircraft to d-c voltage and current for operating the motor. The brushless motor insures compliance with airline requirements that the machine generates no electrical interference. The air separation device preferably is a pressure swing adsorption (PSA) unit including at least one bed of molecular sieve material. The air flow pattern through the device is selected to provide adequate cooling for components thereof and at the same time providing alternate paths in case one should become blocked due to the location of the machine under the passenger seat. The machine includes means for reducing the level of noise generated to a value acceptable for airline use, filter means for removing bacteria from the oxygen supplied and means to remove or prevent both radio frequency interference and electromagnetic interference. The method and apparatus has the capability of delivering oxygen at various flow rates and a relatively high purity level, depending upon the prescribed needs of the user, as well as delivering oxygen for nebulizer use at a relatively lower purity and relatively higher flow rate. The machine preferably includes a PSA unit containing two beds and four-way valve means for connecting the compressed air supply means to the beds in a controlled manner, and a timing and control means which operates the system in a manner such that a four-way valve can be used, particularly of the slide type with its advantages of long life and reliability.

The foregoing and additional advantages and characterizing features of the present invention will become clearly apparent upon a reading of the ensuing detailed description together with the included drawing wherein:

BRIEF DESCRIPTION OF THE DRAWINGS FIGURES

DETAILED DESCRIPTION OF THE ILLUSTRATED EMBODIMENTS

Figure 1:
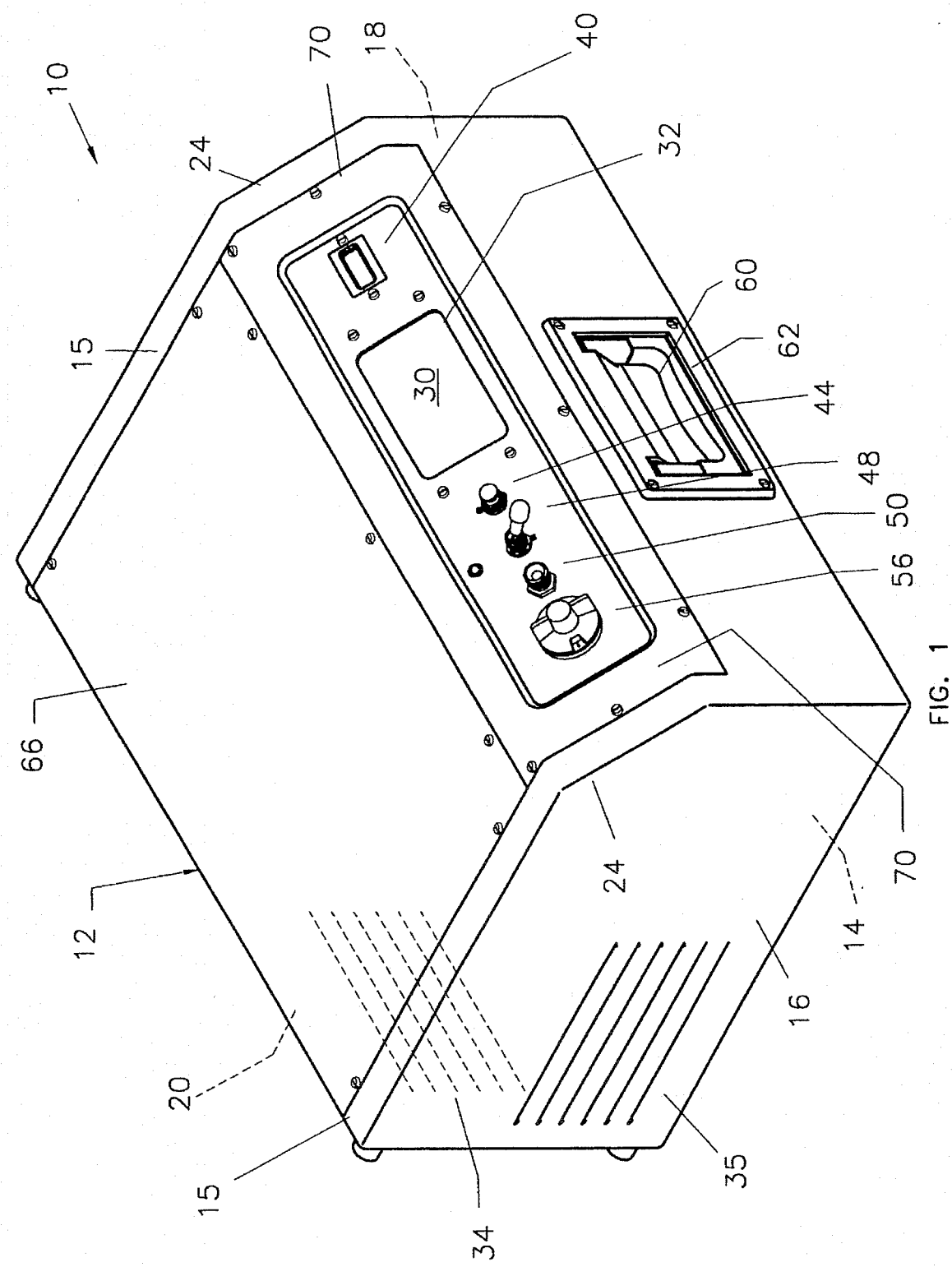
FIG. 1 is a perspective view of a portable machine according to the present invention for on-board supply of therapeutic oxygen to passengers in an aircraft.

Airlines are confronted with difficult decisions about providing therapeutic oxygen for the increasing number of passengers with chronic lung conditions or other diseases requiring continuous oxygen in flight. Many airlines in the past have not provided these services, but increasingly public expectations and legislation around the world are making it necessary to provide therapeutic oxygen for passengers disabled by lung disease and other breathing disorders.

Compressed oxygen cylinders are a cumbersome and costly choice for these requirements. For long flights several portable cylinders are needed, or at least one large fixed cylinder. The time required to install these cylinders in the aircraft cabin, to transport them as dangerous cargo before and after use, and then service and recharge them is very considerable. Some installations block out revenue seats, and all represent a safety hazard from compressed oxygen.

Accordingly, the primary objective of the present invention is to provide an apparatus and method for supplying oxygen to passengers on aircraft on an as needed basis without storing it at high pressure, extremely low temperatures or in very limited quantity. Providing such a method and apparatus involves a number of considerations and challenges. Aircraft have a virtually limitless supply of pressurized air available off their turbines from which oxygen could be separated by known separation and concentration techniques such as pressure swing adsorption (PSA) and others. However, the airlines do not consider tapping air from the turbines as an acceptable approach. Air inside the aircraft cabin is available for use by the above-noted separation techniques, but those separation techniques require the cabin air to be pressurized by a compressor. The need for a compressor gives rise to the further challenges of providing an electric motor for driving the compressor which can be operated from electrical power available on the aircraft and in a manner which does not provide hazardous electrical interference. Another consideration is the desirability of the machine being small in size and relatively light in weight so as to be portable and locatable under a passenger seat on the aircraft.

In accordance with the present invention, a brushless d.c. motor is selected for driving the compressor, the brushless nature of the motor avoiding the generation of any electromagnetic interference which otherwise could provide a safety hazard during operation of the aircraft. Aircraft in general have electrical power outlets at certain locations in the cabin to accommodate the use of vacuum cleaners during ground maintenance. This power source, however, typically is 115 volt a.c. at 400 Hertz. Therefore, in accordance with the present invention there is provided circuit means for connecting the fractional horsepower, d.c. brushless motor of the compressor to the aircraft a.c. electrical power source, the circuit means including means for converting the a.c. voltage and current on the aircraft to d.c. voltage and current for operating the motor.

FIG. 1 shows a machine generally designated 10 according to the present invention for on board supply of therapeutic oxygen to passengers in an aircraft. Machine 10 includes a housing 12 of generally rectangular shape having a base 14 for resting on the floor, a top 15 spaced from base 14, a pair of side walls 16 and 18, a rear wall 20 and a front wall including an upstanding portion 22 and an inclined portion 24. Housing 12 has a relatively low profile with the distance between top 16 and base 14 being relatively small so that machine 10 can fit under the passenger seats on a commercial airliner. Located on the inclined portion 24 of the housing front wall are the following machine components. An air intake passage or opening 30 has a sheet of polyurethane filter material 32 or the like extending there across. Intake 30 receives air from the aircraft cabin for separation within machine 10 into a concentrated supply of oxygen for a passenger in a manner which will be described. Inlet 30 also provides an incoming path for air which serves to flow over and cool operating machine components within housing 12. Two outlets for the flow of cooling air are provided, one on rear wall 20 and designated 34 in FIG. 1 and another on one of the sidewalls such as sidewall 16 and which is designated 35 in FIG. 1. As a result, cooling air flowing through housing 12 has alternate paths to either of the outlets 34 or 35 in the event that one of the outlets becomes blocked during use of machine 10. This could happen with machine 10 being placed under the passenger seat and against baggage also located under the seat or against the wall of the aircraft.

An elapsed time indicator or similar meter 40 is located on inclined portion 24 of the front wall next to inlet 30, for example on the right-hand side as viewed in FIG. 1, for monitoring the total duration of operation time of machine 10. Meter 40 provides an appropriate indication of recommended maintenance for machine 10. Located on front wall portion 24 next to inlet 30 on the opposite side thereof, i.e. on the left as viewed in FIG. 1, is the manual switch operator 44 of a circuit breaker for machine 10 which typically is tripped in response to stalling of the compressor motor or a short circuit. The main on-off switch 48 for controlling operation of machine 10 is located next to switch operator 44. Preferably switch 48 is of the BAT type which must be pulled outwardly before operating so as to prevent accidental or inadvertent turning off of machine 10. An outlet fitting 50 for supply of oxygen is located on front wall portion 24, and in the present illustration next to switch 48. Outlet fitting receives oxygen from the separating and concentrating apparatus within housing 12 in a manner which will be described. During use of machine 10, fitting 50 is connected to one end of a flexible tubing (not shown) of rubber or like material, the other end of which is connected to a nasal cannula or the like which is held in place on the passenger's nose in a known manner for administering the oxygen. Such cannula and tubing combinations are conventional, readily commercially available and form no part of the present invention.

A manually-operated selector switch 56 also is provided on wall portion 24, being located on the end near wall 16. Switch 56 is of the rotary, dial type, and is used to select the flow rate of oxygen supplied by machine 10 via outlet 50. The flow rate, typically from 1–5 liters per minute, is selected according to medical prescription responsive to the patient's needs. There is also provided a recessed area 60 in front wall portion 22 to receive a handle 62 which is pivotally mounted therein. Preferably, handle 62 is spring-loaded in the recessed area such as by coil springs or the like associated with the pivotal connection thereof. A removable cover 66 is provided on housing top 15 and extends to inclined front wall portion 24 and is secured by suitable fasteners around the periphery thereof as shown in FIG. 1. Cover 66 has no components attached to it and is easily removable to facilitate repair and maintenance on the apparatus within housing 12. A semi-permanent cover 70 is provided on the inclined front wall portion 24 and secured by fasteners as shown. Machine 10 is connected via a conventional insulated electrical conductor (not shown in FIG. 1) to an outlet on the aircraft which supplies electrical power in a manner which will be described. Housing 12 typically is electrically grounded to the ground of the aircraft structure.

Figure 2:
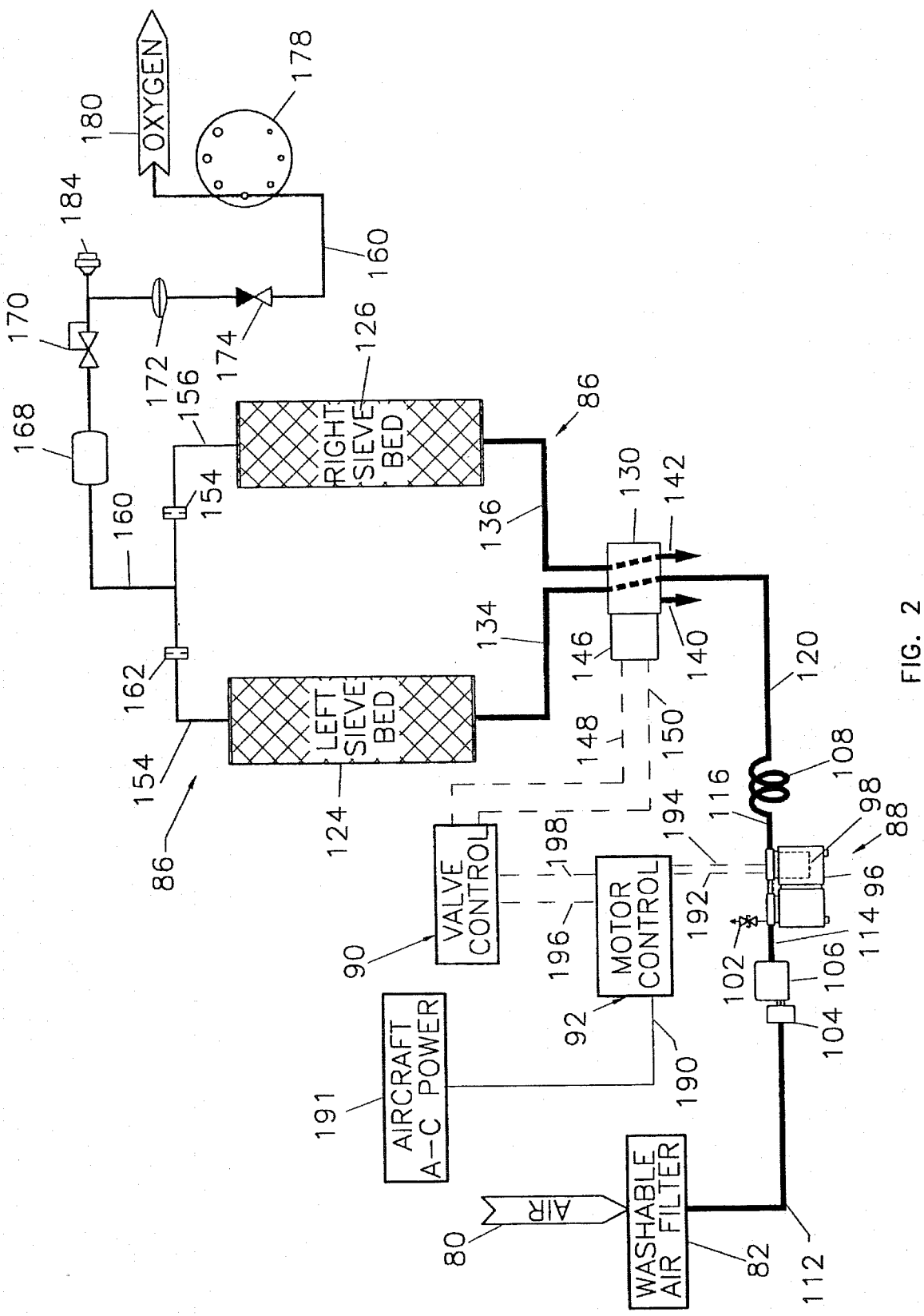
FIG. 2 is a schematic diagram illustrating the method and apparatus of the present invention for on-board supply of therapeutic oxygen to passengers in an aircraft.

FIG. 2 illustrates the method and apparatus according to the present invention for on-board supply of oxygen to passengers on an aircraft. The apparatus components shown in FIG. 2 are contained within the housing 12 shown in FIG. 1. Aircraft cabin air flowing into inlet 30 shown in FIG. 1 is represented by arrow 80 in FIG. 2 and this incoming air is filtered by a washable air filter 82. The apparatus comprises, briefly, an air separation device generally designated 86 for separating oxygen from the air within the aircraft cabin, self-contained compressed air supply means generally designated 88, timing and control means generally designated 90 and circuit means generally designated 92 for connecting components of the apparatus to the aircraft on-board source or supply of a-c electrical power. In particular, the self-contained compressed air supply means 88 comprises a compressor 96 which, in accordance with the present invention, is driven by a d-c brushless motor 98 which is in direct drive relationship with compressor 96. Compressor 96 is provided with a relief valve 102. In addition, an intake filter 104 and intake resonator 106 are associated with compressor 96 on the input side thereof, and a heat exchanger 108 is associated with compressor 96 on the output side. Thus, filtered air from filter 82 is drawn along conduit 112 by the suction of compressor 96 through filter 104 and the resonating chamber 106 and through conduit 114 to the intake of compressor 96. Compressed air from the outlet of compressor 96 is forced along conduit 116 through heat exchanger 108 wherein it is cooled by the flow of cabin air from inlet 30 shown in FIG. 1 in contact with heat exchanger 108 and out one of the outlets 34 or 35 shown in FIG. 1.

Cooled, compressed air from heat exchanger 108 flows via conduit 120 to the device 86 which functions to separate oxygen from the compressed air and concentrate it for delivery to the passenger. According to the preferred mode of the present invention, device 86 comprises a pressure swing adsorption(PSA) unit including at least one molecular sieve bed. A description of the nature and operation of the PSA unit as well as alternative forms of separation device is included hereinafter. In the apparatus of the present invention there is provided a pair of beds 124 and 126 under control of a valve 130 which preferably is a four-way valve. Conduit 120 is connected to one port of valve 130 which selectively allows flow of the compressed air to either of the beds 124 and 126 via conduits 134 and 136, respectively, connected to ports of valve 130. This pressurizes the beds for the separation operation in a manner which will be described. The valve 130 also selectively connects a pair of exhaust ports connected to exhaust conduits 140 and 142 to the conduits 134 and 136, respectively, for exhausting the beds 124 and 126 in a manner which will be described. The exhaust is through a muffler (not shown in FIG. 2) for reducing the level of noise generated by the apparatus to a value acceptable for airline use. Valve 130 is of the slide type and is operated by a solenoid 146 which is connected via lines 148, 150 to the timing and control means 90, the operation of all of which will be described in detail presently.

A pair of conduits 154 and 156 leading from the outputs of beds 124 and 126 are joined at one end to a single output conduit 160 for providing concentrated oxygen for use by the passenger. Conduits 154 and 156 are provided with restricting orifices 162 and 164, therein, to provide a counter current purge limiting function. Along conduit 160 there is provided a mixing tank 168, pressure regulator 170, bacteria filter 172, check valve 174 and flow controller or regulator 178. Mixing tank 168 contains a molecular sieve bed which collects nitrogen and delays the oxygen flow enough so that the purity of the output is relatively constant. Output oxygen available at outlet fitting 50 in FIG. 1 for use by the passenger is represented by arrow 180. Purge orifices 162, 164, mixing tank 168, pressure regulator 170 and check valve 174 typically are provided in PSA units and are well known to those skilled in the art. Bacteria filter 172 is provided according to the present invention to remove any bacteria present in the aircraft cabin air. Flow controller 178 is provided according to the present invention to allow prescribed oxygen flow rates, i.e. from 1–5 liters per minute, to be selected. Thus, controller 178 has a plurality of settings for delivering oxygen at a relatively high rate of purity generally about 90%. In addition, controller 178 has another setting for delivering oxygen for nebulizer use at a relatively lower purity and a relatively higher flow rate, i.e. at about 7 liters per minute. A high pressure switch 184 also is connected to output conduit 160 between regulator 170 and bacteria filter 172.

The circuit means 92, which will be described in detail presently, has an input connected via line 190 to the source 191 of a-c power on the aircraft. As previously described, this source includes the plurality of power outlets at various locations within the aircraft cabin for operating appliances such as vacuum cleaners during ground maintenance. Line 190 is plugged into one of such outlets, and a-c voltage and current are made available in the on-board power circuit including the outlets during operation of the apparatus. The on-board source, however, typically is 115 volt a-c at 400 Hertz. Therefore, circuit means 92 includes means, which will be described, for converting the a-c voltage and current on the aircraft to d-c voltage and current for operating compressor motor 98 and the timing and control means 90. Thus, circuit means 92 as shown in FIG. 2 is connected via lines 192 and 194 to compressor motor 98 and is connected via lines 196 and 198 to timing and control means 90.

Timing and control means 90, which will be described in detail presently, provides timing and control signals on lines 148 and 150 for operating four way valve 130 by means of solenoid valve 146. D.C. voltage and current for operating timing and control means 90 is obtained from circuit means 92. The timing and control signals on lines 148, 150 operate valve 130 to alternately direct compressed air into one of the beds 124, 126 while depressurizing the other of the beds during the pressure swing adsorption cycle. In addition, the timing and control signals on lines 148, 150 provide a sufficient time delay on start up so that pressure is available to shift valve 130 into operative position which will be described in further detail presently.

According to the preferred mode of the present invention, air separation device 86 comprises a PSA unit which in the present illustration includes the two molecular sieve beds 124 and 126. Molecular sieve beds use a ceramic zeolite material called molecular sieve which selectively adsorbs nitrogen molecules in preference to oxygen and other gases in air. This is a physical process of adsorption and is not a chemical reaction. Molecular sieve is securely packed in cylinders which comprise the two identical sieve beds 124 and 126. When compressed air is directed into the sieve bed the nitrogen in the air is selectively adsorbed by the molecular sieve, leaving oxygen and other inert gases in the atmosphere to pass through the sieve bed for delivery to the user. The molecular sieve soon becomes saturated with nitrogen, and the sieve bed must therefore be depressurized and cleared of nitrogen by back-flushing the bed with a portion of the product oxygen. To provide continuous oxygen output, airflow from the compressor 96 is directed alternately to one of the two molecular sieve beds 124, 126 which alternately pressurize and depressurize with a pre-set cycle time of approximately 25–30 seconds. This is the pressure swing adsorption process. The sieve bed is not adversely affected by the pressure cycling, and does not therefore require replacement or maintenance. Oxygen output is mainly a function of the compressed air supply, the molecular sieve material, and the cycle time. The mixing tank 168 which is filled with molecular sieve material smoothes the oxygen output flow and purity. Each of the molecular sieve beds 124 and 126 can be spring loaded internally to prevent movement of the molecular sieve granules in response to vibration such as during operation of the aircraft. For a more detailed description of the manner in which beds 124, 126 can be spring loaded, reference may be made to U.S. Pat. No. 4,826,510 issued May 2, 1989 entitled "Portable Low Profile DC Oxygen Concentrator" and assigned to the assignee of the present invention, the disclosure of which is hereby incorporated by reference.

Molecular sieve oxygen concentrators are not able to provide 100% oxygen, because argon and other relatively inert gases also pass through the sieve bed without being adsorbed. The maximum oxygen concentration from the separation device 86 of the present invention is approximately 95%, with the remainder being largely argon. Extensive medical experience on the ground and in the air has demonstrated that this has no practical significance for people who require therapeutic oxygen. The oxygen concentration typically falls as output flow increases, because at high flows some nitrogen will usually be present at the sieve bed outlet during part of the cycle. Thus, the flow rate in the machine of the present invention is up to about 5 liters per minute. There is no practical effect on the oxygen concentration remaining in the aircraft cabin. A molecular sieve oxygen concentrator merely separates a small percentage of the oxygen from air passing through the concentrator and diverts it to the person needing oxygen. This does not significantly deplete the oxygen in the cabin of the aircraft.

The maximum pressure in the machine 10 during normal operation is 28 psi, and the maximum stored oxygen is approximately one liter. This offers considerable safety advantages in an airline cabin compared with large volumes of compressed oxygen or other stored oxygen systems. The machine 10 of the present invention is not assessed as IATA "angerous goods" for the purposes of storage or handling. It does not require specific safety precautions when being transported on aircraft or otherwise, and may be safely stored in an airport terminal if required. The molecular sieve beds never need to be recharged, and the overall device requires very little maintenance. They do not require to be based or returned to an oxygen bay, and therefore may be stored at airline "hub" airports or other locations that are operationally convenient. The machine 10 of the present invention is designed to fit discretely and securely under an airline economy seat. It does not need to be removed from the cabin when the passenger disembarks, and may be left under the seat until the aircraft returns to a storage location or the unit is next required. The oxygen concentrator will continue to operate during stop-overs and delays. It will operate from appropriate 110 volt 60 Hertz mains power supplies on the ground if required for prolonged transit stops.

While air separation device 86 preferably is a PSA unit including at least one molecular sieve bed, machine 10 of the present invention can employ alternate means of air separation. One is electrochemical in the form of ceramic wafers sandwiched between electrodes. Oxygen is selectively transported electrically from electrode to electrode at elevated temperature. An air compressor normally is required to supply the air to the point of separation. Another alternative is chemical which consists of the cyclic oxidation and disassociation of solid metal oxides at elevated temperature. An air compressor is employed in a manner similar to the arrangement of FIG. 2. Still another alternative is permeation wherein permeable membranes selective to oxygen are employed. Compressed air is passed over the membrane surface, and the oxygen component is selectively removed. Silicone is a typical material used in such a process.

The foregoing three alternate means of air separation are by way of illustration of other variations which may be employed. In each of the foregoing alternate means of air separation, a compressor similar to compressor 96 in the system of FIG. 2 would be employed, with electrical power being supplied thereto via circuit means 92.

Compressor 96 is preferably a two cylinder air compressor which requires no lubrication and provides air at a pressure of about 28 psi for pressurizing the sieve beds 124 and 126. In accordance with the present invention compressor 96 is powered by the brushless DC circuit drive motor 98, the brushless nature of motor 98 avoiding the generation of any electromagnetic interference which otherwise could provide a safety hazard during operation of the aircraft. Motor 98 employs rare earth magnets and an ironless stator for increased efficiency and torque. It does not require a separate position sensor for the rotor, and uses the motor back EMF. in contrast to Hall Effect transistors typically employed by many brushless motors. In addition, motor 98 has a thermal sensor in the stator thereof which shuts down the circuit 92 in a manner which will be described if the temperature of the motor stator exceeds, for example, 85° C. The compressor pressure relief valve 102 opens at a predetermined pressure, for example 50 PSIG, and a cooling fan (not shown) can be mounted on the compressor crankshaft.

In accordance with the present invention, valve means 130, which selectively allows flow of compressed air to one of the beds 124, 126 while exhausting or depressurizing the other bed, is a four way valve of the slide type. This valve, in contrast to spool type valves, is easy to dismantle and repair, and due to the slide component being of synthetic plastic material such as Delrin, the valve has an especially long life. Furthermore, this slide type valve is characterized by extremely simple operation including a basic on-off control via the signal on lines 148, 150 to switch the compressed air flow from one bed 124, 126 to another and to exhaust the other bed. However, in accordance with the present invention, it was determined necessary to adopt the cyclic process herein to the requirements of valve 130.

In particular, the slide type four way valve 130 requires pressure to drive the slide from one position to another. Valve 130 cannot switch on initial start-up in response to an electrical signal alone. Therefore, in accordance with the present invention the timing of the cycle is adjusted so that when pressure builds up in one of the beds 124, 126 it is available to switch the valve 130. In particular, the pilot solenoid valve 146, in response to a signal on lines 148, 150 opens a port in valve 130 to introduce pressure to one of the beds 124, 126. Then, after one-half cycle pressure from one of the beds 124, 126 is utilized to move the slide of valve 130. In other words, there is a time delay in the operation of valve 130 on start-up, i.e. the slide of valve 130 does not move until one-half cycle has occurred. Thus, both the signal on lines 148, 150 and pressure in the system of beds 124, 126 are utilized to operate valve 130 to switch pressure from one of the beds 124, 126 to the other.

Figure 3:
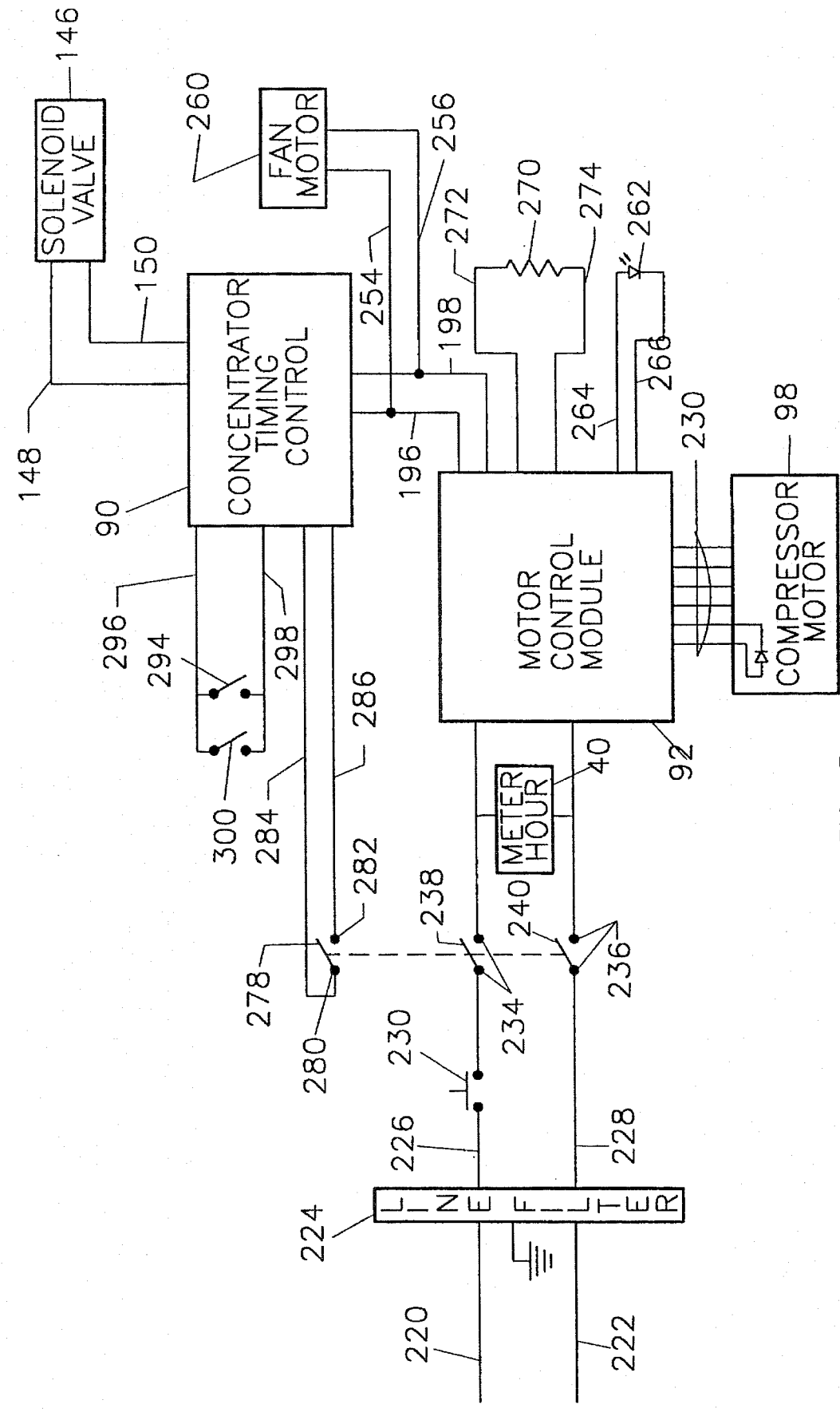
FIG. 3 is a schematic block diagram further illustrating the timing control and motor control in the system of FIG. 2.

FIG. 3 shows in further detail the interconnection and interrelationship of timing and control means 90 and circuit means 92. Lines 220, 222 carry the a-c voltage and current available on the aircraft which, as previously explained, typically is 115 volts at a frequency of 400 Hertz. Lines 220, 222 are connected to the input of a filter 224 which passes to circuit means 92 a frequency compatible with the components of circuit 92 such as 400 Hertz. Lines 226, 228 connect the output of filter 224 to the input of circuit means 92. A protective circuit breaker 230 is connected in line 226, the manual operator 44 of which was described in connection with FIG. 1. The elapsed time indicator or hours meter 40 described in FIG. 1 is connected across lines 226 and 228. The main on-off switch 48, also described in connection with FIG. 1 for turning machine 10 on and off, is shown in FIG. 3 with the pairs of contacts 234 and 236 connected in lines 226 and 228, respectively, and with switch arms 238 and 240 provided for engaging the contacts 234 and 236, respectively.

As previously described, circuit means 92 converts the a-c voltage and current on the aircraft to d-c voltage and current for operating compressor motor 98 and the timing and control means 90. A plurality of lines collectively designated 250 in FIG. 3 connect the output of circuit 92 to the brushless d-c compressor motor 98. Lines 196 and 198 connect the output of circuit 92 to the timing and control means 90. The d-c voltage and current on lines 196, 198 also is connected via a pair of lines 254 and 256 to another brushless d-c motor 260 for operating a fan (not shown in FIGS. 1–3) to provide additional cooling for the air separation device 86. A light emitting diode 262 which can be located on front panel 24 of housing 12 (not shown in FIG. 1) is connected via lines 264 and 266 to circuit means 92 for indicating normal power consumption of motor 260. A resistance 270 is connected to circuit means 92 by lines 272, 274.

The main on-off switch 48 also controls timing and control means 90 by the switch arm 278 and pair of contacts 280 and 282 connected by lines 284 and 286, respectively, to the circuit 90. Lines 148 and 150 connect the output of timing and control means 90 to solenoid valve 146 as previously described. There is also provided a low oxygen output pressure alarm feature. Low pressure at the output regulator 178 in FIG. 2 is most commonly caused by failure in the electrical power supply for device 86, a thermal or overload condition or a fault in the motor 98/compressor 96 combination. The alarm and associated circuitry are in timing and control means 90 which will be described in further detail presently. The low pressure sensor operatively associated with output regulator 178 is represented by the normally open switch 294 connected to timing and control means 90 by lines 296 and 298 as shown in FIG. 3. A high internal air temperature alarm feature also is included which responds to a cooling failure. Abnormally high temperature within machine 10 can result from the air inlet 30 shown in FIG. 1 becoming blocked, from failure of the cooling fan or from increased heat generation by components within machine 10. The temperature sensor which is placed at an appropriate location within housing 12 is represented by the normally-open switch 300 shown in FIG. 3 and which is connected by lines 296 and 298 to the aforementioned alarm and associated circuit which will be described.

Figure 4:
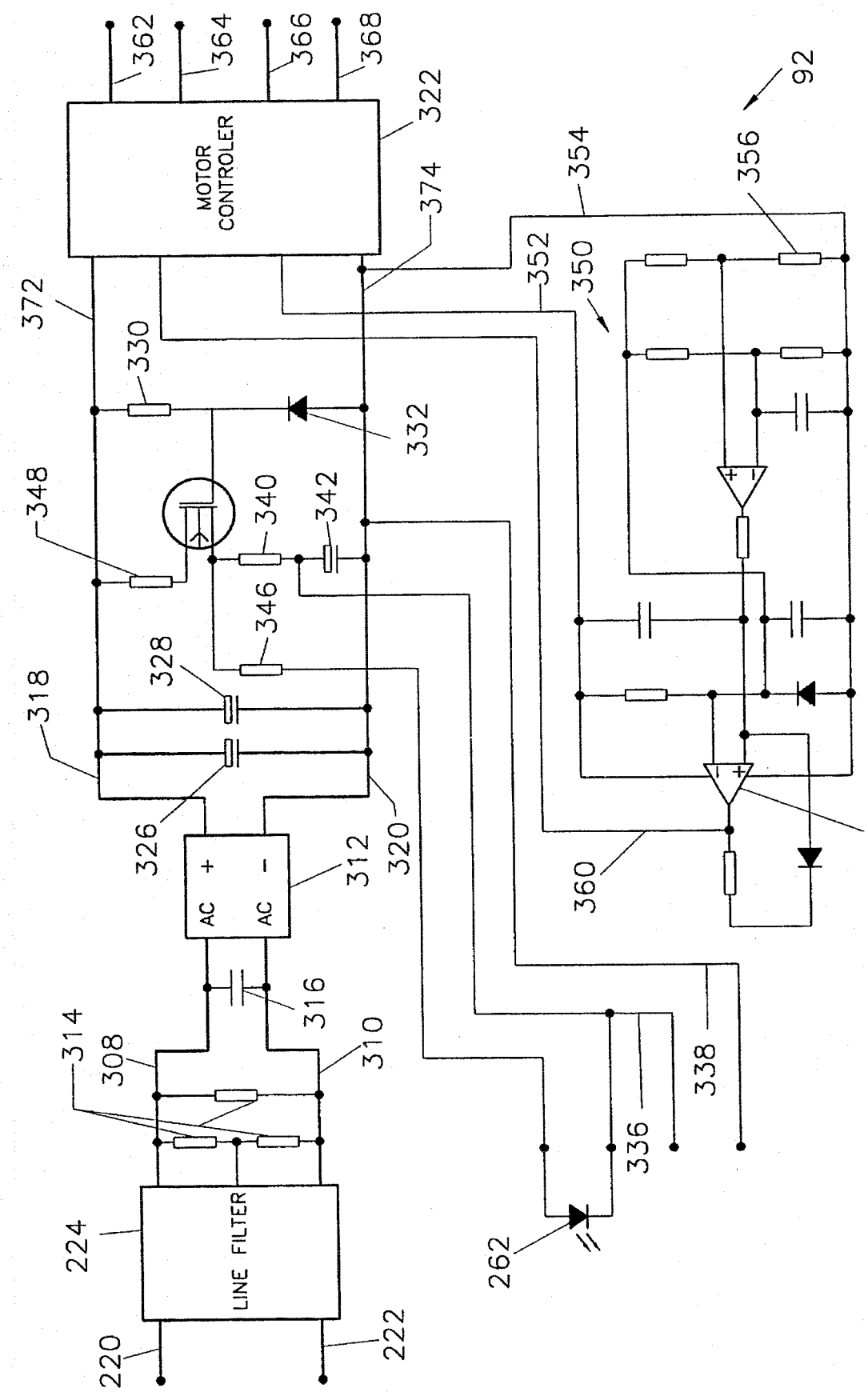
FIG. 4 is a schematic circuit diagram further illustrating the motor control of FIG. 3.

FIG. 4 shows in detail the circuit means 92 of FIG. 3 for converting the a-c voltage and current on the aircraft to d-c voltage and current for operating compressor motor 98 and the timing and control means 90. Lines 220, 222 which carry the a-c voltage and current available on the aircraft and filter 224, all of which were described in connection with FIG. 3 are shown also in FIG. 4. Circuit breaker 230 and hours meter 40 of the arrangement of FIG. 3 have been omitted for convenience in illustration. As previously described the a-c voltage and current available on the aircraft typically is 115 volts at a frequency of 400 Hertz, and filter 224 protects the aircraft electrical system from undesirable electrical (EMI) noise generated by the motor. Lines 308, 310 in the circuit of FIG. 4 connect the output of filter 224 to the input of a bridge rectifier component 312. A varistor network 314 is connected across lines 308, 310 for surge protection along with capacitor 316 connected across the rectifier input. The output of rectifier 312 is connected by lines 318, 320 to a motor controller 322 which will be described in detail presently. The rectified voltage on lines 318, 320 is smoothed by capacitors 326 and 328 and regulated by a network including resistor 330, zener diode 332 and MOSFET transistor device 334. This is for the purpose of supplying d-c voltage to timing and control means 90 and to fan motor 260. In particular, the regulated d-c voltage output is on lines 336, 338 which are connected to timing and control means 90 and to fan motor 260. This d-c output is available at the junction between a voltage-dropping resistor 340 connected to the output of device 334 and a capacitor 342 connected to line 320. The light-emitting diode 262 located on housing front panel 24 for indicating flow of current to fan motor 260 is connected between line 336 and a current-limiting resistor 346 connected to MOSFET transistor 334. Resistor 348 connected between device 334 and line 318 serves as a heat sink for device 334.

Circuit means 92 includes a thermal shutdown network 350 which causes the compressor motor 98 to stop if the motor winding temperature reaches a predetermined value, for example 85° C. Voltage for operating network 350 is on lines 352 and 354. A thermistor 356 is mounted in the stator windings of motor 98. If the winding temperature reaches the predetermined magnitude, the operational amplifier circuit 358 latches and sends a braking signal on line 360 to motor controller 322 thereby causing compressor motor 98 to stop. The motor 98 will not restart until the power switch 44 has been turned off for a predetermined time, for example 10 seconds, and then turned on.

Figure 5:
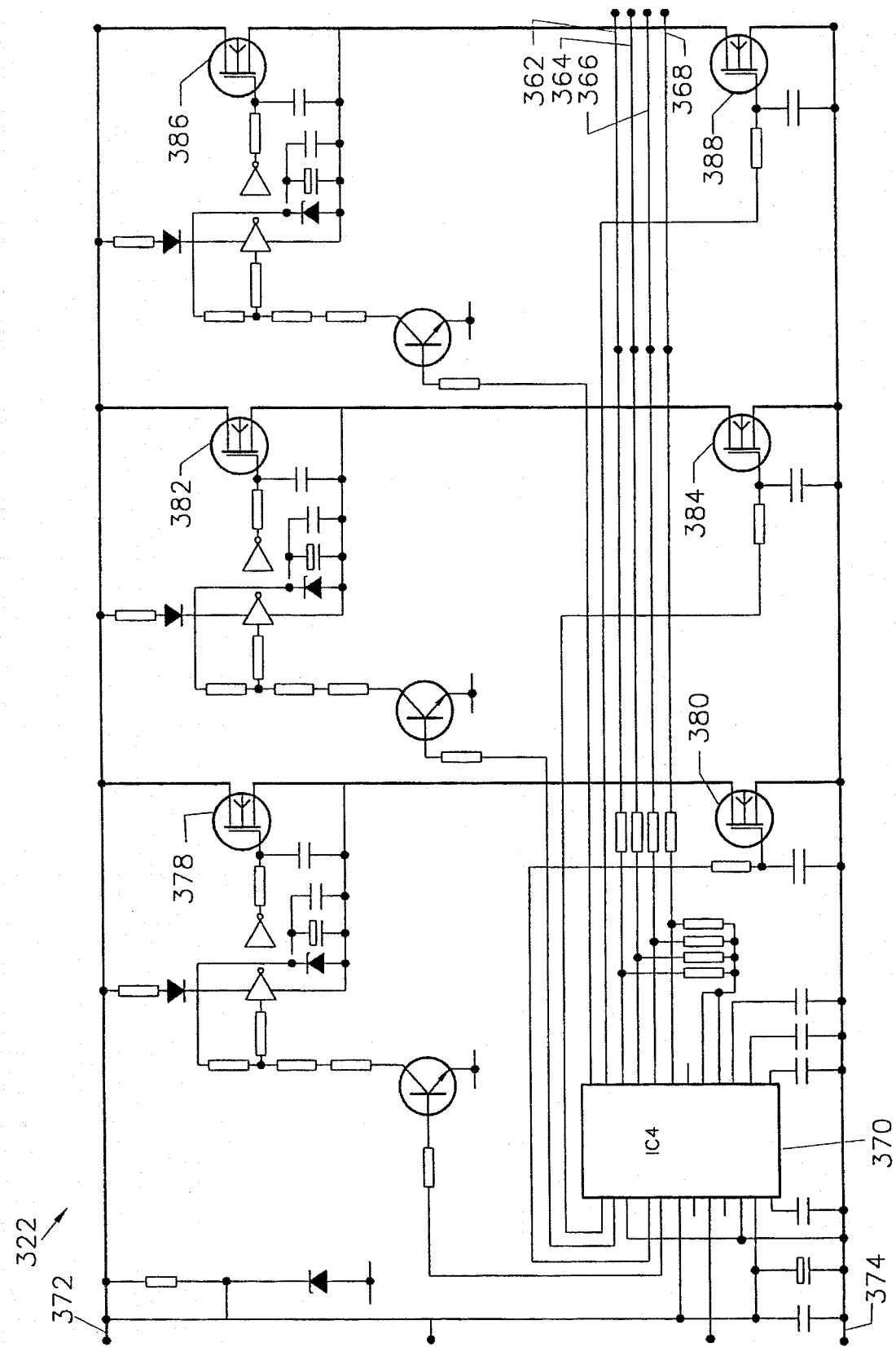
FIG. 5 is a schematic circuit diagram further illustrating a portion of the circuit of FIG. 4.

Motor controller 322 uses the d-c voltage on lines 318 and 320 to provide voltage on lines 362, 364, 366 and 368 for operating compressor motor 98 which is the brushless d-c type. Controller 322 of the present illustration is of the unidirectional, back emf sensing type in contrast to Hall Effect transistors often used with brushless d.c. motors. Controller 322 is shown in further detail in FIG. 5 and is based on a motor control integrated circuit 370 which preferably is a Phillips TDA5142T. The controller 322 shown in FIG. 5 provides a three phase, six step bridge with 120 degree conduction periods. The previously described nominal 150 volt d.c. is applied to lines 372, 374 from which the compressor motor operates through the bridge provided by the six MOSFET transistors 378, 380, 382, 384, 386 and 388.

Figure 6:
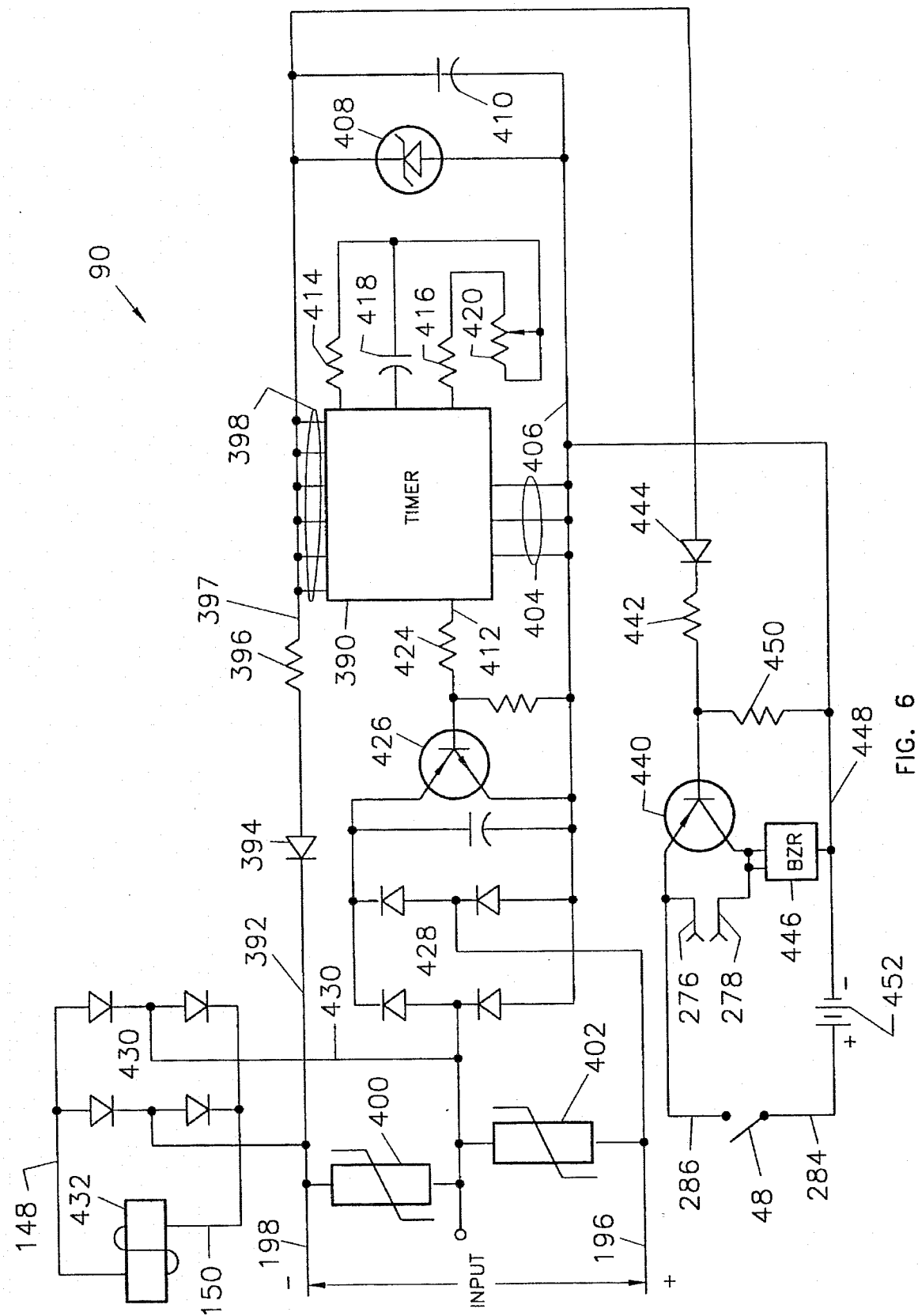
FIG. 6 is a schematic circuit diagram of the timing control of FIG. 3.

The timing and control means 90 is shown in further detail in FIG. 6. The basic timing function is provided by a U1 timer component 390. The d-c voltage from circuit means 92 on lines 196 and 198 operates the circuit of FIG. 6. It is supplied to timer 390 via line 392, the series combination of diode 394 and resistor 396, line 397 and lines collectively designated 398. Varistors 400, 402 are connected across lines 196, 198 for protection. Lines collectively designated 404 connect timer 390 to a circuit reference line 406. The combination of Zener diode 408 and capacitor 410 regulate the voltage across timer 390. Timer 390 provides output pulses on line 412, and the time between pulses is determined by an RC network connected to timer 390 and including resistors 414 and 416, capacitor 418 and potentionmeter 420. Adjusting potentionmeter controls the time between the output pulses on line 412.

The output pulse generated by timer 390 are utilized to operate solenoid valve 146 which, in turn, initiates operation of four way valve 130 as previously described. In particular, timer output pulses on line 412 are applied through resistor 424, transistor 426, diode network 428, line 429 and diode network 430 to the solenoid 432 of valve 146. Thus, in response to each output pulse from timer 390 the valve 146 is operated.

The timing and control means 90 of FIG. 6 also includes a network providing the low oxygen output pressure alarm and the high internal air temperature alarm previously described in connection with FIG. 3. Lines 276 and 278 are connected to the sensor switches 274 and 280 shown in FIG. 3 and also are connected across the collector-emitter circuit of a transistor 440, the base of which is connected through the series combination of resistor 442 and diode 444 to d-c supply line 397. An audible alarm device 446 is connected between the collector of transistor 440 and a line 448 connected to circuit reference line 406. A voltage dropping resistor 450 is connected between the base of transistor 440 and alarm device 446, and a battery 452 is connected between alarm device 446 and the portion of the circuit including lines 284, 286 and the main on-off switch 48 described in connection with FIG. 3.

Thus, when either a low oxygen pressure condition causes closing of sensor switch 274 or a high internal air temperature condition causes closing of sensor switch 278, alarm device 446 is energized by the network of FIG. 6 to provide an audible alarm signalling the condition. The alarm network is disabled when the main on-off switch 48 is open.

By way of example, in an illustrative machine 10, brushless d.c. motor 98 and circuit means 92 including controller 322 are of the type commercially available from CADAC Holdings Ltd. of New Zealand. Other brushless d.c. motors of the type useable in machine 10 are commercially available from Ametek Inc., BEI, Bodine Electric Co. and General Electric Co. Four way valve 130 can be of the type commercially available from ASCO. Timer 390 preferably is commercially available under the designation MC14541.

Figure 7:
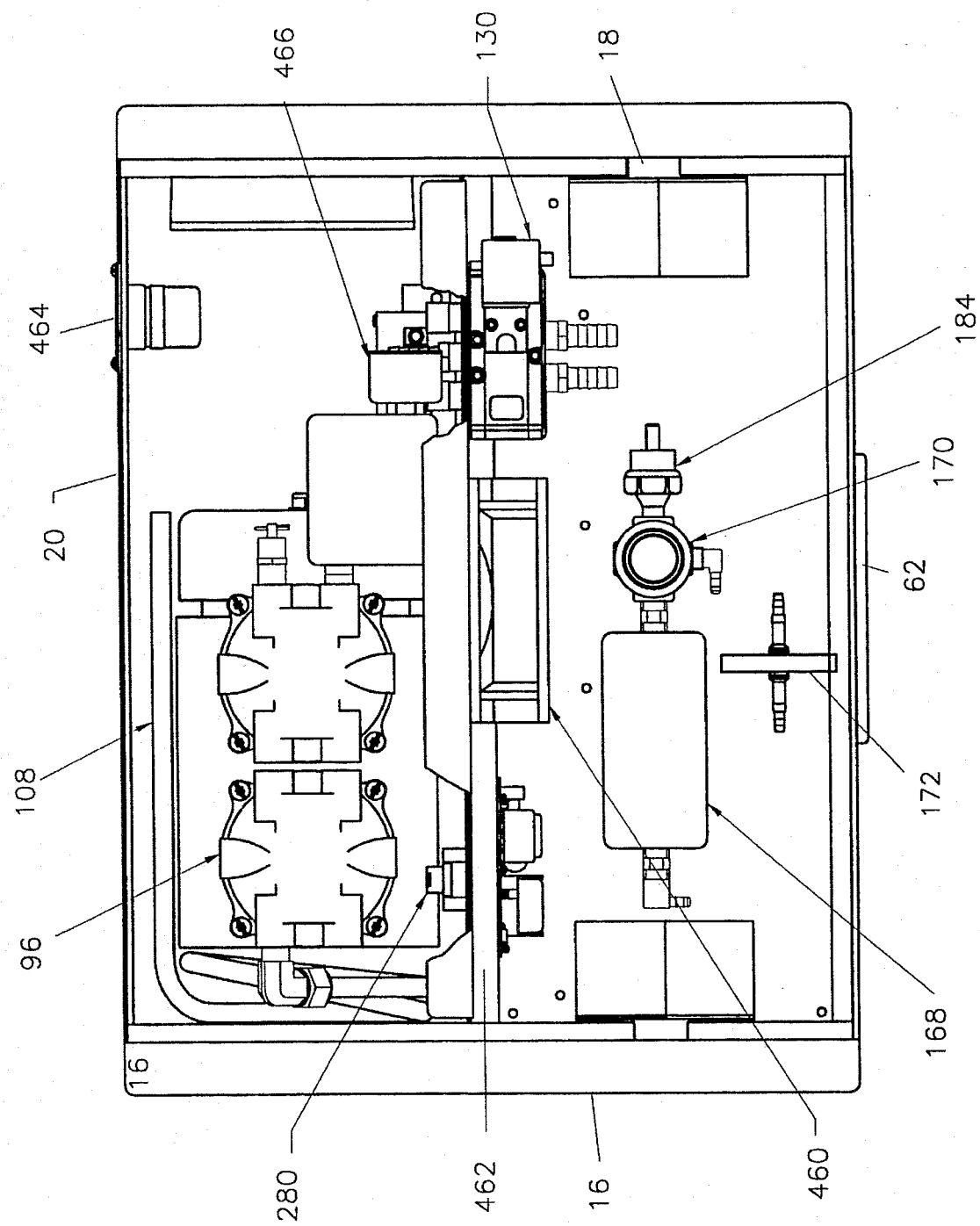
FIG. 7 is a plan view of the apparatus of FIG. 1 with the top of the machine removed.
Figure 8:
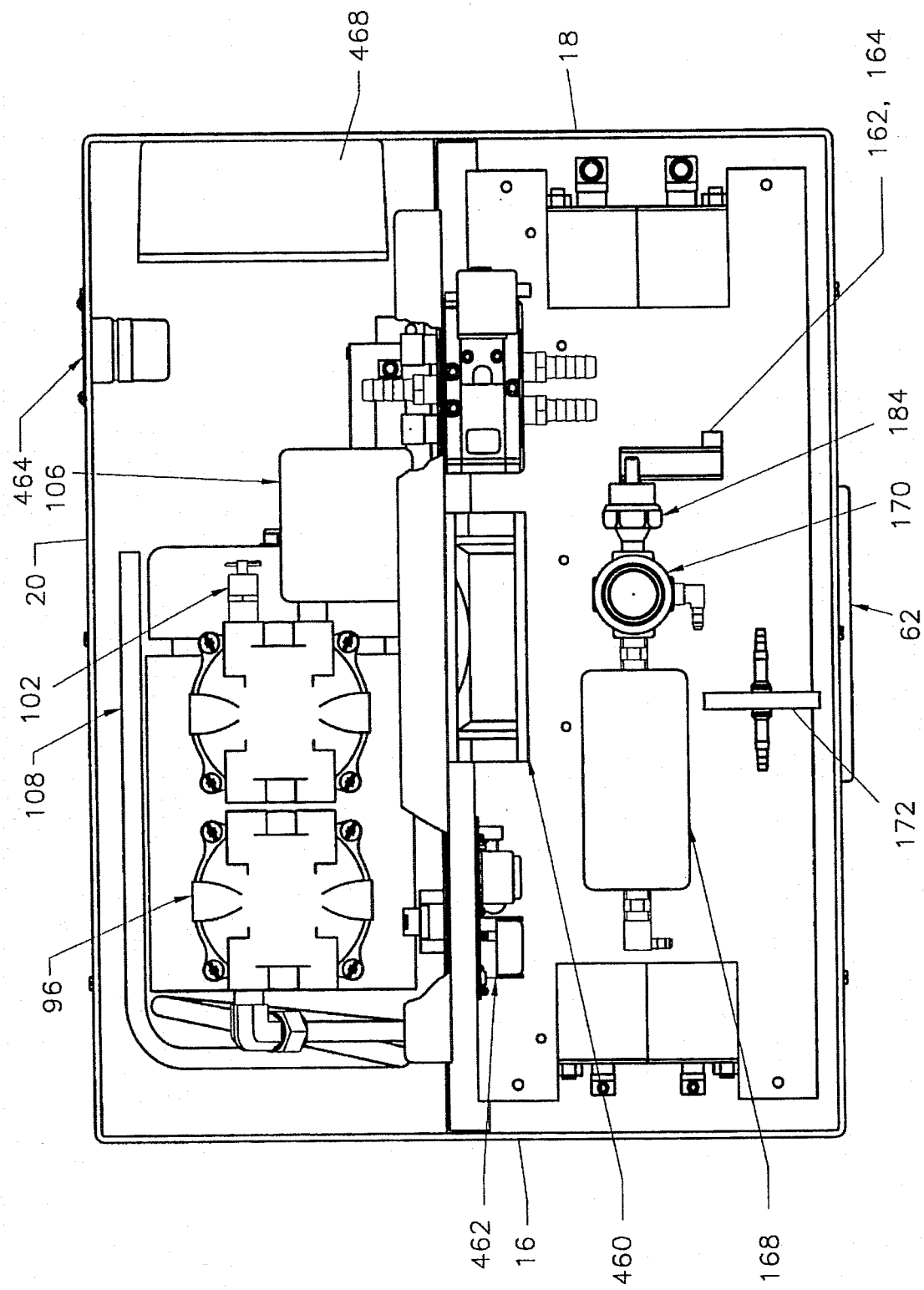
FIG. 8 is a plan view similar to FIG. 7 taken from a lower elevation in FIG. 1.
Figure 9:
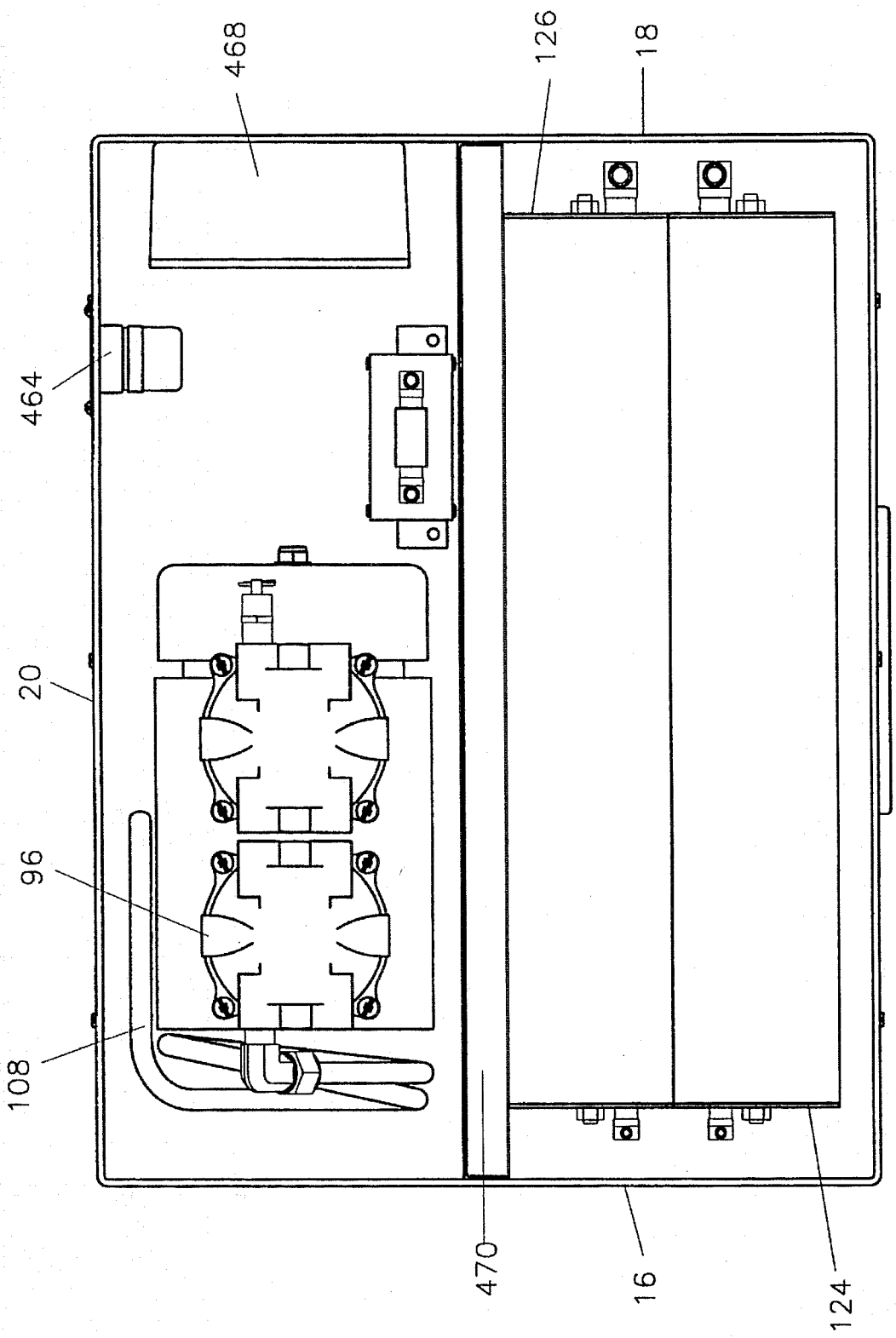
FIG. 9 is a plan view similar to FIG. 8 taken from a still lower elevation in FIG. 1.

FIG. 7 is a plan view of the apparatus of FIGS. 1 and 2 with the top 15 removed to show the components of the apparatus and their relative positions. FIGS. 8 and 9 are similar plan views taken at lower elevations in the apparatus. Referring first to FIG. 7, a fan 460 is located generally centrally in the arrangement and is driven by the brushless d.c. motor 260 shown and described in FIG. 3. The relative locations within housing 12 of several of the components of the system of FIG. 2 are shown in FIG. 7. The temperature sensor 280 is mounted on a circuit board designated 462 in FIG. 7. A receptacle 464 for connection to a conductor leading from the aircraft on-board electrical system is mounted in housing rear wall 20. FIG. 7 also shows the location of an intake muffler 466 which was not shown in the system of FIG. 2. Various hoses for connecting the components together as indicted in FIG. 2 are not shown in FIG. 7. FIG. 8 illustrates the relative locations of the circuit board 462 for the components of timing and control means 92 and a circuit board 468 for the components of circuit means 92. In FIG. 8 the intake muffler 466 is removed for convenience in illustration. In FIG. 9 there is shown a central wall 470 defining a region which contains the molecular sieve beds 124, 126. Compressor 96 and circuit board 468 are shown in elevation, rather than in section.

Figure 10:
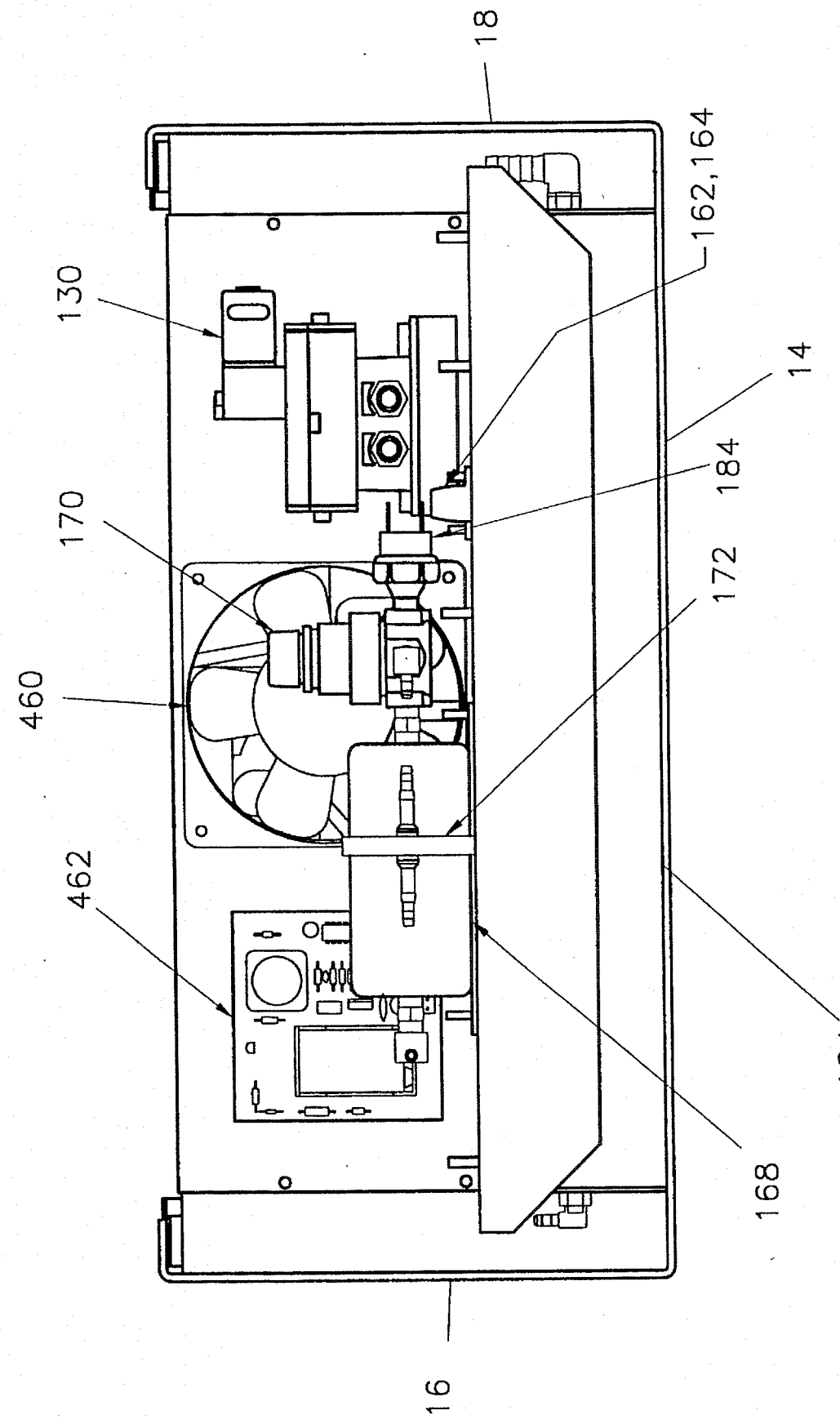
FIG. 10 is an elevational view with parts removed taken from the front of the machine of FIG. 1.
Figure 11:
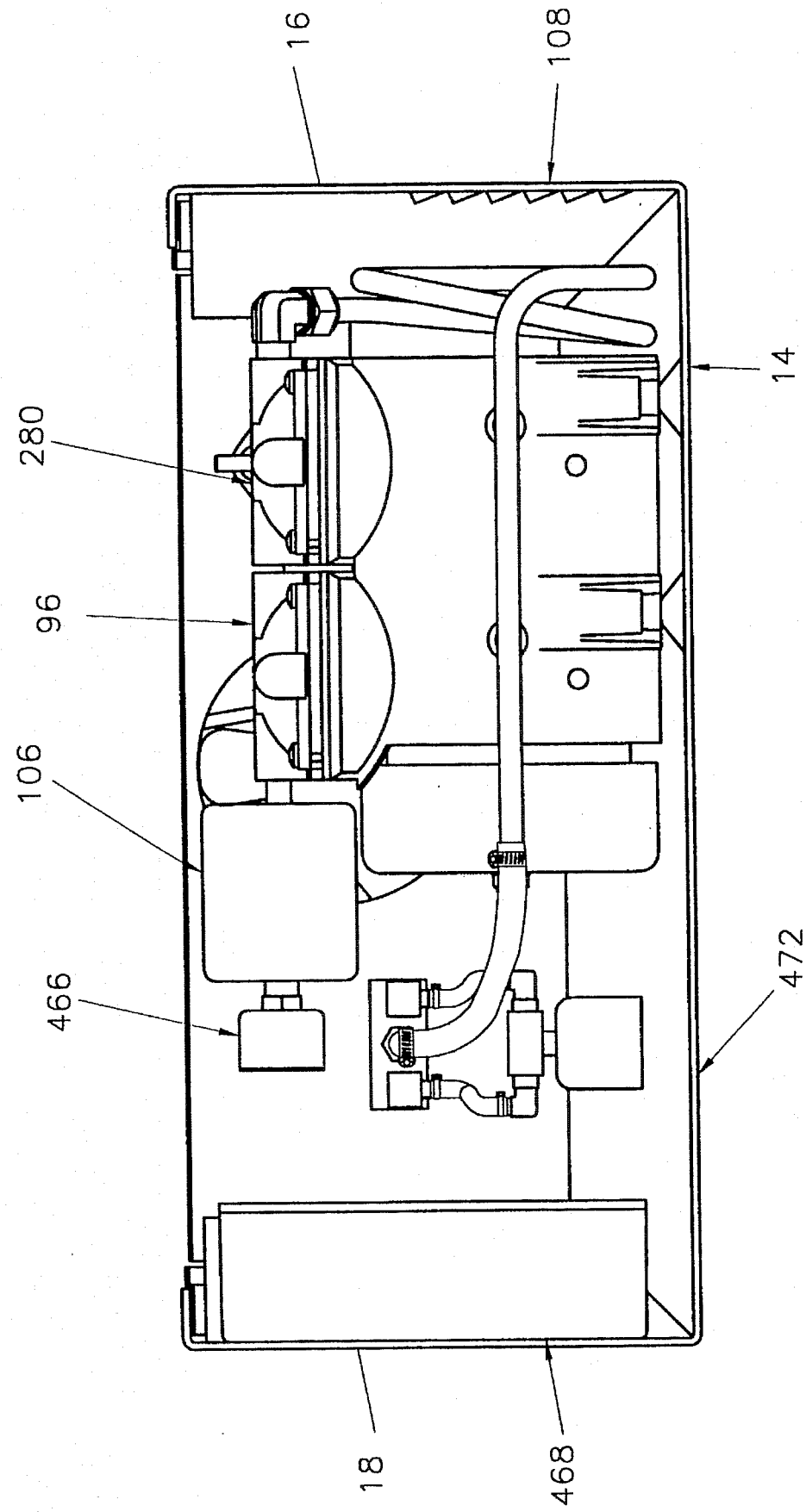
FIG. 11 is an elevational view with parts removed taken from the rear of the machine of FIG. 1.

In FIG. 10 the components within housing 12 are seen with the front portion of the housing removed, and in FIG. 11 the components within housing 12 are seen with the rear portion of the housing removed.

Figure 12:
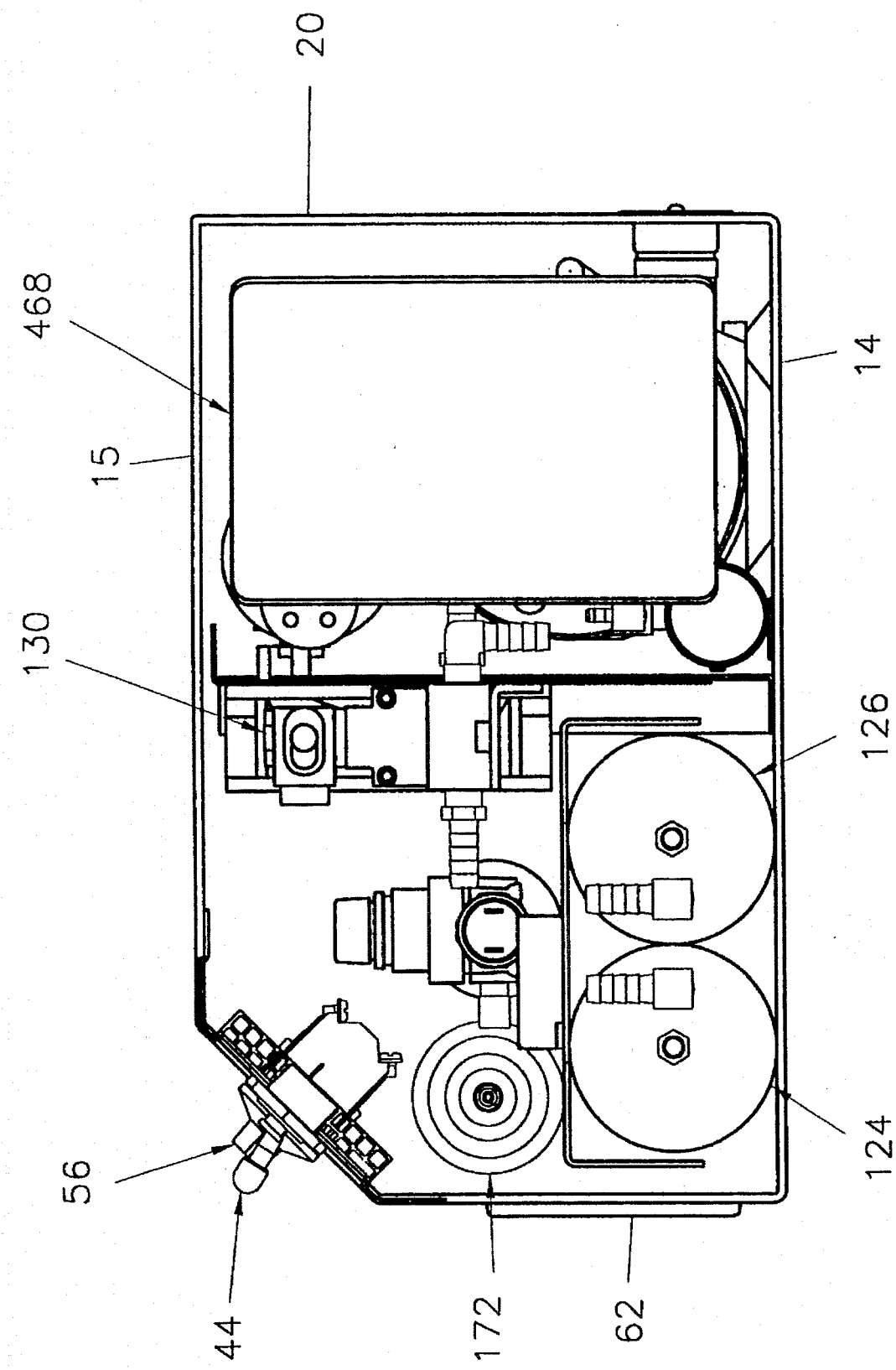
FIGS. 12–15 are vertical sectional views taken at spaced locations from one end to the other in the machine of FIG. 1.
Figure 13:
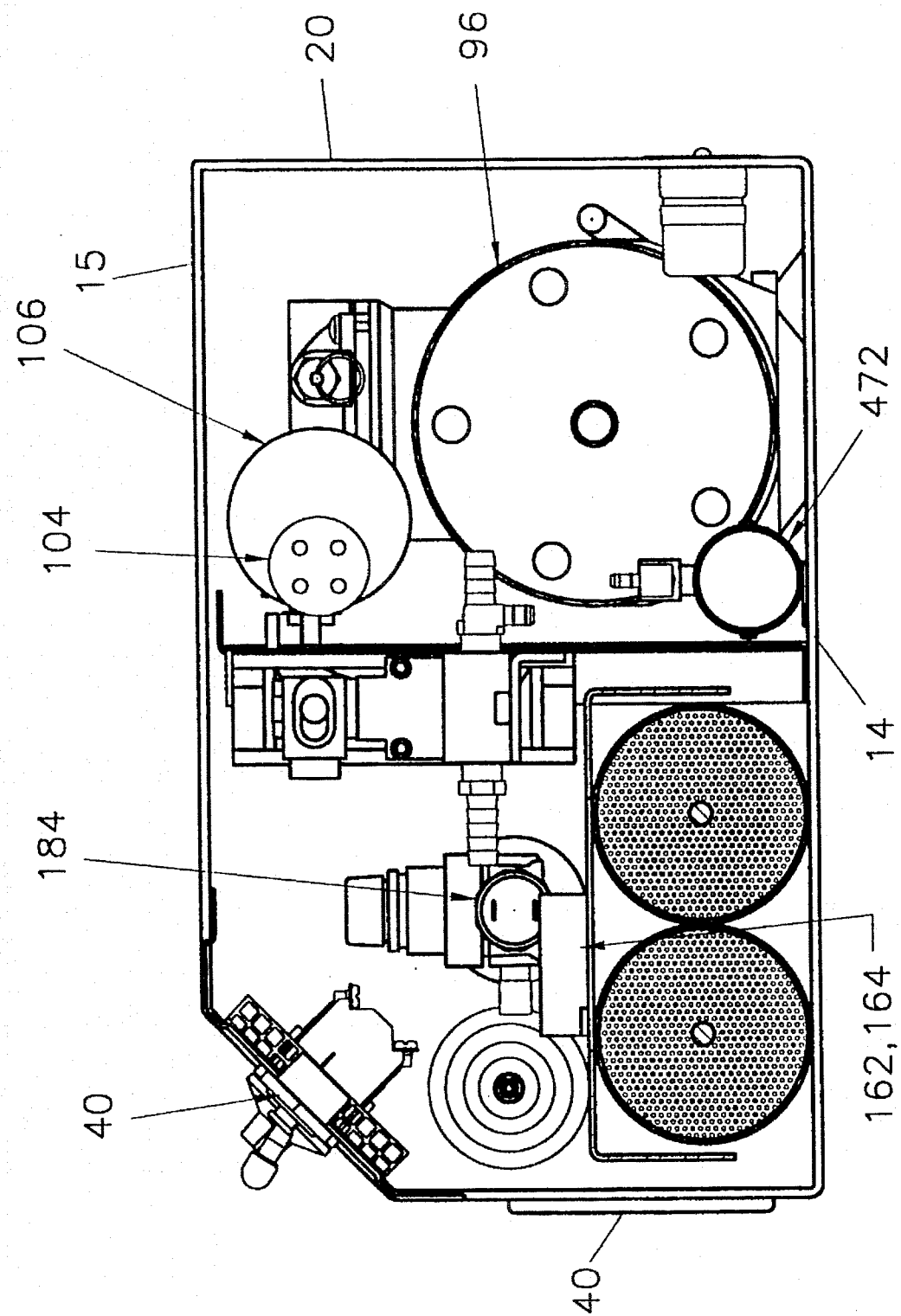
Figure 14:
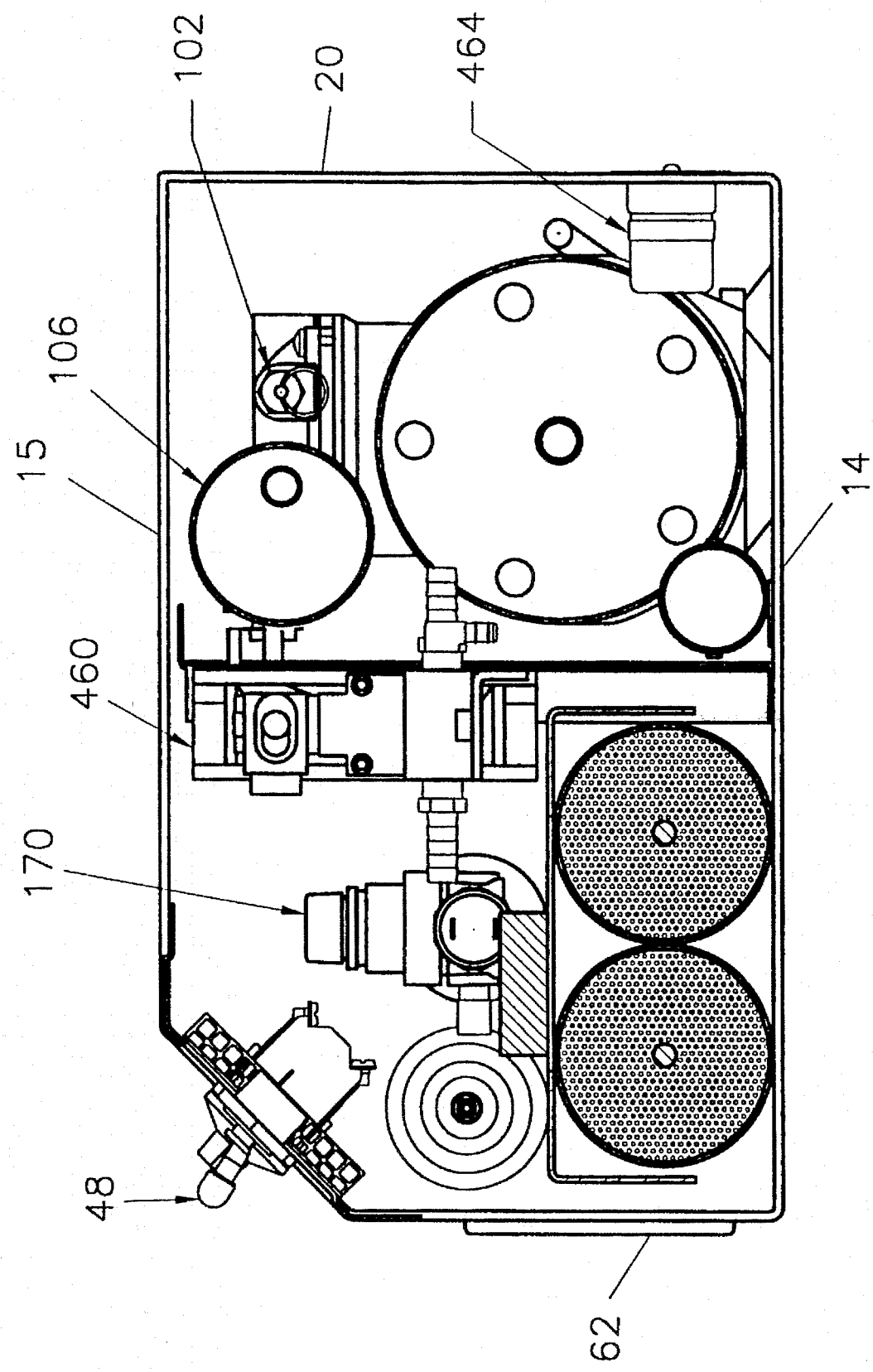
Figure 15:
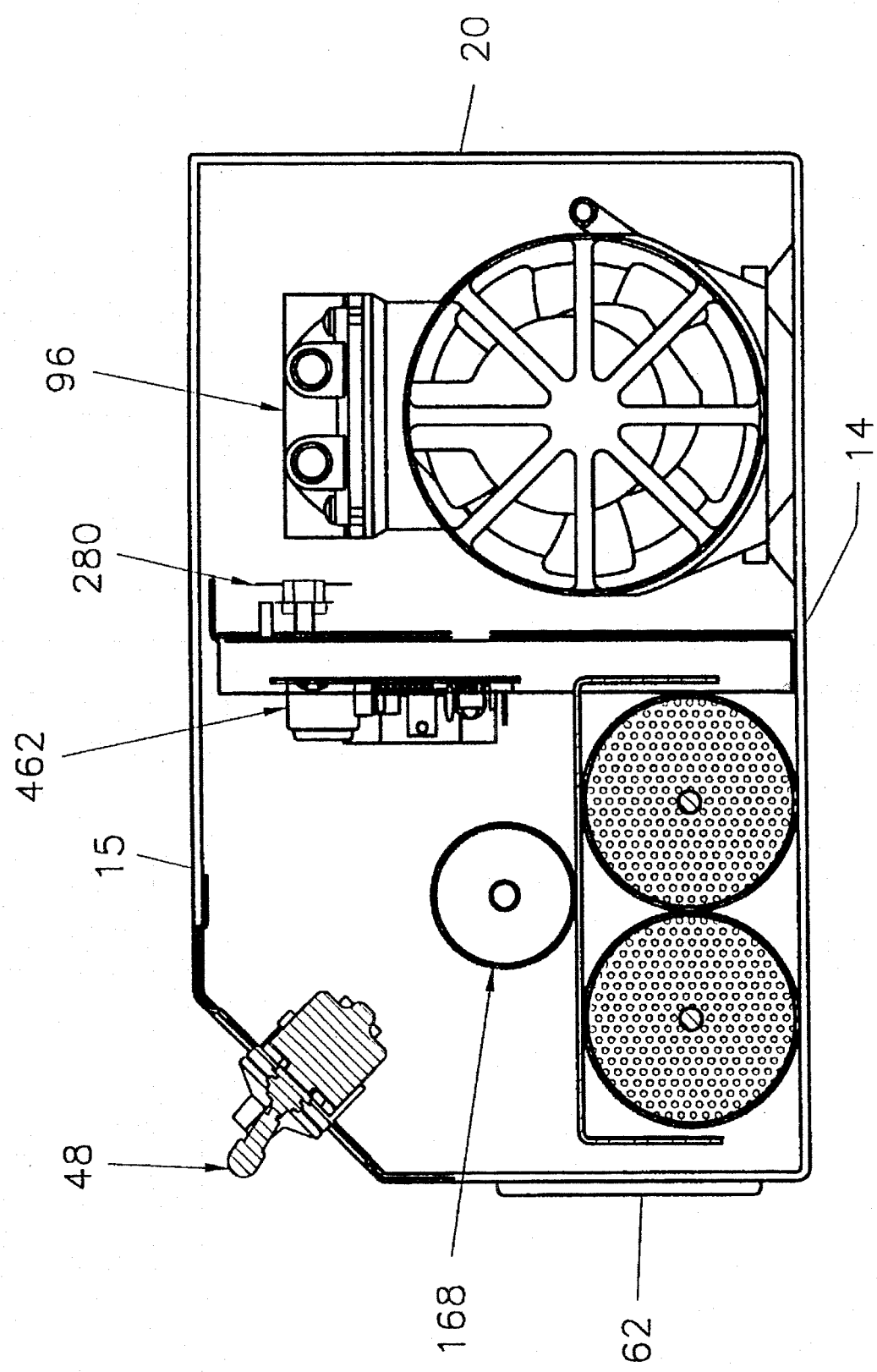
Figure 16:
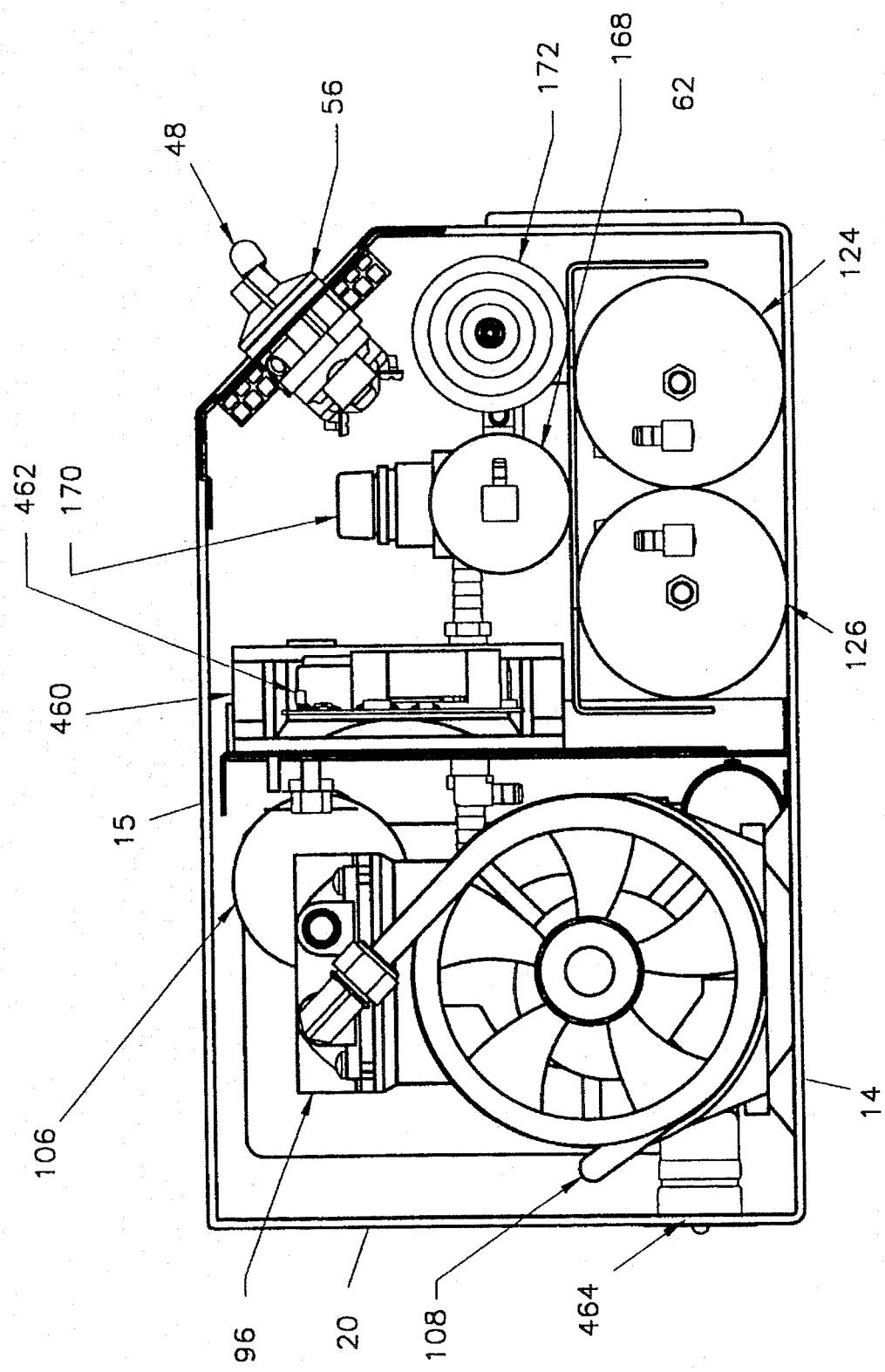
FIG. 16 is a vertical sectional view similar to FIG. 12 taken from the opposite end of the machine of FIG. 1.

FIGS. 12–15 show the components within housing 12 viewed from the right-hand end of the housing and proceeding into the housing in a left-ward direction, the terms right and left being in reference to housing 12 as seen in FIG. 1. In particular, FIG. 12 shows the components within housing 12 as seen with side wall 18 removed. Beds 124, 126 are separated from components thereabove by a thin-walled, channel-shaped structural member 414. FIG. 13 is taken from a location slightly inwardly of housing 12 in reference to FIG. 12. FIG. 14 is taken from a location slightly further inwardly relative to FIG. 13 and before the mid-point of the distance between housing sidewalks 16 and 18. FIG. 15 is taken at a location beyond the mid-point. FIG. 16 is a view similar to FIG. 12 but taken from the opposite end of housing 12 with side wall 16 removed.

It is therefore apparent that the present invention accomplishes its intended objects. There is provided a method and apparatus which supplies oxygen to passengers on aircraft on an as needed basis without storing it at high pressure, extremely low temperature or in very limited quantity. The air in the aircraft cabin is utilized to supply such oxygen, and the electrical power available on the aircraft is utilized in the apparatus and method in a manner which does not create any electrical interference problems. The apparatus is small in size and light in weight so as to be portable, and it has a low profile so as to be locatable under a passenger seat on an aircraft.

While an embodiment of the present invention has been described in detail, that is for the purpose of illustration, not limitation.

What is claimed is:

1. A method for on-board supply of oxygen in an aircraft having a source of electrical power thereon wherein a PSA unit including a pair of beds of molecular sieve material is located in a housing having a shape and size allowing it to be positioned under a seat on the aircraft, wherein self-contained compressed air supply means is located in said housing, and wherein there is provided means for supplying electrical power to said self-contained compressed air supply means from said source of electrical power on the aircraft, said method comprising the steps of:

a) providing four-way valve means of the slide type for connecting said compressed air supply means to said pair of beds in a controlled manner;

b) providing pilot valve means operatively associated with said four-way valve means;

c) providing timing and control means connected in controlling relation to said four-way valve means and to said pilot valve means for operating said pilot valve means to provide an initial pressure in said PSA unit for operating said four-way valve means a predetermined time thereafter;

d) utilizing said electrical power supplied to said self-contained compressed air supply means also for operating said timing and control means; and e) operating said PSA unit to provide output oxygen.

2. A method for on-board supply of oxygen in an aircraft having a source of a-c electrical power thereon comprising the steps of:

a) providing a housing containing an air separation device and self-contained compressed air supply means comprising a compressor operatively connected to said air separation device and a brushless d-c motor for driving said compressor, said housing having a shape and size allowing it to be positioned under a seat in the aircraft;

b) providing four-way valve means of the slide type for connecting said compressed air supply means to said air separation device in a controlled manner, pilot valve means operatively associated with said four-way valve means, and timing and control means connected in controlling relation to said four-way valve means;

c) placing said housing in a position of use under a seat in the aircraft;

d) introducing air from within the cabin of the aircraft to said supply means;

e) converting the a-c voltage and current on the aircraft to d-c voltage and current for operating said motor;

f) utilizing said d-c voltage and current for operating said motor also for operating said timing and control means;

e) operating said timing and control means to cause said pilot valve means to provide an initial pressure in said air separation device for operating said four-way valve means a predetermined time thereafter; and h) operating said air separation device to provide output oxygen.

3. A method according to claim 2, wherein said air separation device comprises a PSA unit including at least one bed of molecular sieve material.

4. A portable machine for on-board supply of oxygen in an aircraft having an a-c electrical power source thereon, said machine comprising:

a) a housing having a shape and size allowing it to be positioned under a seat on the aircraft;

b) an air separation device in said housing for separating oxygen from the air inside the aircraft;

c) self-contained compressed air supply means in said housing and comprising a compressor operatively connected to said air separation device and a brushless d-c motor for driving said compressor; and d) circuit means for connecting said d-c motor to said aircraft a-c electrical power source, said circuit means including means for converting the a-c voltage and current on said aircraft to d-c voltage and current for operating said motor.

5. Apparatus according to claim 4, wherein said air separation device comprises a PSA unit including at least one bed of molecular sieve material.

6. Apparatus according to claim 5, further comprising:

a) valve means for connecting said compressor to said at least one bed in a controlled manner;

b) timing and control means connected in controlling relation to said valve means; and c) means for connecting said converting means to said timing and control means for supplying electrical power thereto.

7. Apparatus according to claim 4, further including filter means in said circuit means for removing electromagnetic interference signals.

8. Apparatus according to claim 4, wherein said housing is provided with means for preventing radio frequency interference.

9. A portable machine for on-board supply of oxygen in an aircraft having a source of electrical power thereon, said machine comprising:

a) a housing having a base for resting on the floor of the aircraft, a top spaced from said base, a pair of solid side walls, a solid front wall and a solid rear wall, the distance between said base and top wall allowing said housing to fit under a seat in the aircraft;

b) an air separation device in said housing for separating oxygen from the air inside the aircraft, said device having a longitudinal axis and being disposed with the longitudinal axis thereof substantially parallel to the plane of said base;

c) self-contained compressed air supply means in said housing and operatively connected to said air separation device;

d) means for supplying electrical power to said self-contained compressed air supply means from said source of electrical power on the aircraft; and e) means to cool said machine including said air separation device and said self-contained air supply means and comprising air inlet means on said solid front wall of said housing and air outlet means on said solid rear wall of said housing and on at least one of said solid side walls of said housing so that cooling air flowing through said housing from said inlet has alternate paths to either of said outlet means to maintain cooling of said machine in the event that one of said outlet means becomes blocked.

10. Apparatus according to claim 9, wherein said air separation device comprises a PSA unit including at least one bed of molecular sieve material.

11. Apparatus according to claim 9, further including means within said housing defining a buffer region between a portion of said housing front wall containing said inlet means and the remainder of the interior of said housing to provide liquid splash protection for components of the apparatus in the remainder of the interior of said housing.

12. Apparatus according to claim 9, including:

a) means for removably connecting to said housing the portion of said front wall containing said inlet means; and b) means for removably connecting said top wall to said housing.

13. Apparatus according to claim 9, further including:

a) a recessed area formed in said front wall of said housing;

b) handle means pivotally connected to said housing and located within said recessed area; and c) spring means biasing said handle means in a position within said recessed area.

14. Apparatus according to claim 9, further including means within said housing for defining segmented interior regions of said housing for containing selected ones of said air separation device, said compressed air supply means and said means for supplying electrical power.

15. A portable machine for on-board supply of oxygen in an aircraft having a source of electrical power thereon, said machine comprising:

a) a housing having a shape and size allowing it to be positioned under a seat on the aircraft;

b) a PSA unit including a pair of beds of molecular sieve material in said housing;

c) self-contained compressed air supply means in said housing;

d) four-way valve means of the slide type for connecting said compressed air supply means to said pair of beds in a controlled manner;

e) pilot valve means operatively associated with said four-way valve means;

f) timing and control means connected in controlling relation to said four-way valve means and to said pilot valve means for operating said pilot valve means to provide an initial pressure in said PSA unit for operating said four-way valve means a predetermined time delay thereafter; and g) means for supplying electrical power to said self-contained compressed air supply means and to said timing and control means from said source of electrical power on the aircraft.

16. A portable machine for on-board supply of oxygen in an aircraft having a source of electrical power thereon, said machine comprising:

a) a housing having a shape and size allowing it to be positioned under a seat on the aircraft;

b) a PSA unit including at least one bed of molecular sieve material in said housing;

c) self-contained compressed air supply means in said housing and operatively connected to said at least one bed;

d) means for supplying electrical power to said self-contained compressed air supply means from said source of electrical power on the aircraft;

e) outlet means operatively connected to said at least one bed from which said supply of oxygen is available; and f) manually operated flow rate selector means connected to said outlet means for enabling a user of the machine to selectively control the rate of output oxygen flow, said flow rate selector means having a plurality of discrete settings for delivering oxygen at medically prescribed rates which the user of the machine can select according to his needs while seated in the aircraft.

17. A portable machine for on-board supply of oxygen in an aircraft having a source of electrical power thereon, said machine comprising:

a) a housing having a shape and size allowing it to be positioned under a seat on the aircraft;

b) an air separation device in said housing for separating oxygen from the air inside the aircraft;

c) self-contained compressed air supply means in said housing and operatively connected to said air separation device;

d) means for supplying electrical power to said self-contained compressed air supply means from said source of electrical power on the aircraft;

e) intake resonator means operatively associated with said self-contained compressed air supply means; and f) muffler means operatively associated with said intake resonator means for reducing the level of noise generated to a value acceptable for airline use.

18. Apparatus according to claim 17, wherein said air separation device comprises a PSA unit including at least one bed of molecular sieve material.

19. Apparatus according to claim 17 further comprising:

a) outlet means operatively connected to said air separation device from which said supply of oxygen is available; and b) filter means operatively associated with said outlet means for removing bacteria from oxygen supplied by said air separation device.

20. Apparatus according to claim 19, wherein said air separation device comprises a PSA unit including at least one bed of molecular sieve material.

* * * * *